June 4, 1963

A. TEMPE 3,092,467

APPARATUS FOR THE PRODUCTION OF FERTILIZER
FROM ORGANIC WASTE MATERIALS

Filed July 6, 1959

Inventor
ANDRÉ TEMPE

Kimmel & Crowell
ATTORNEYS

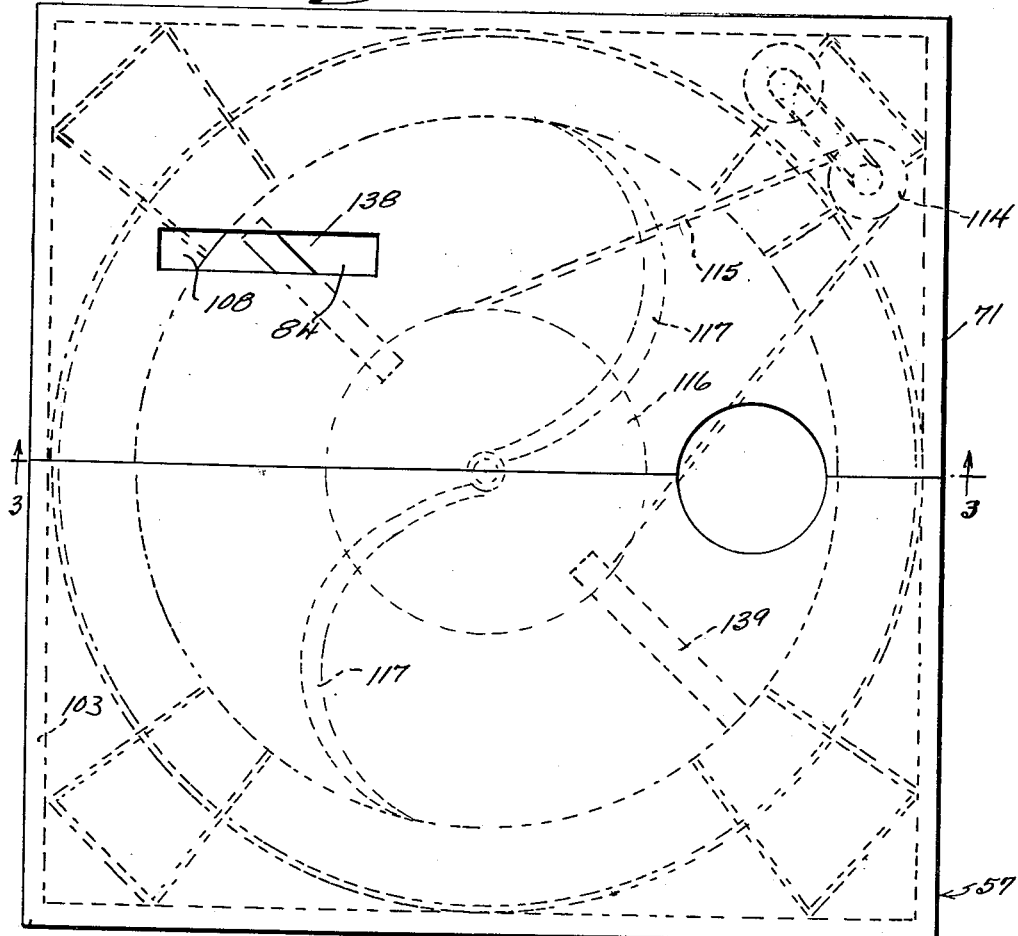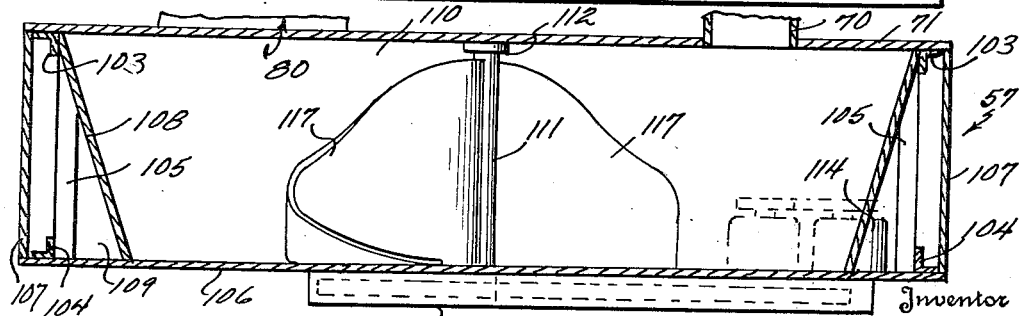

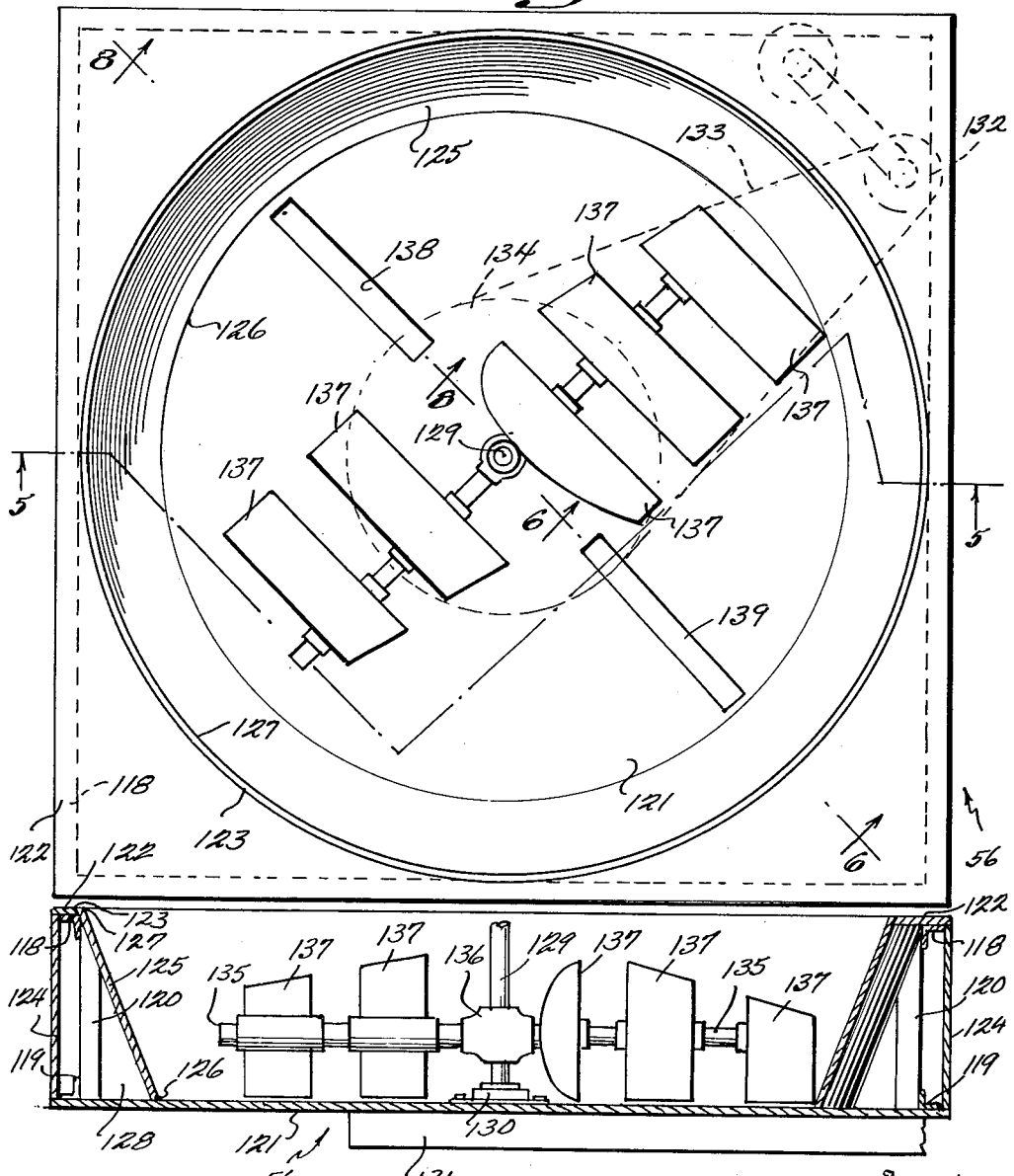

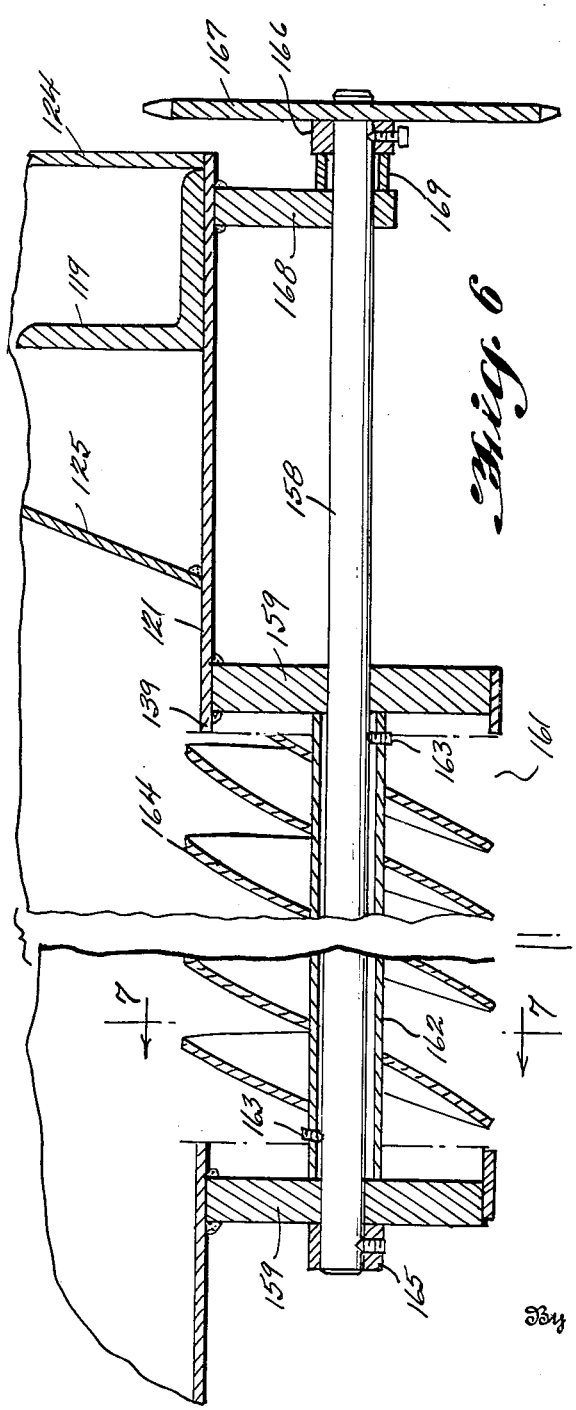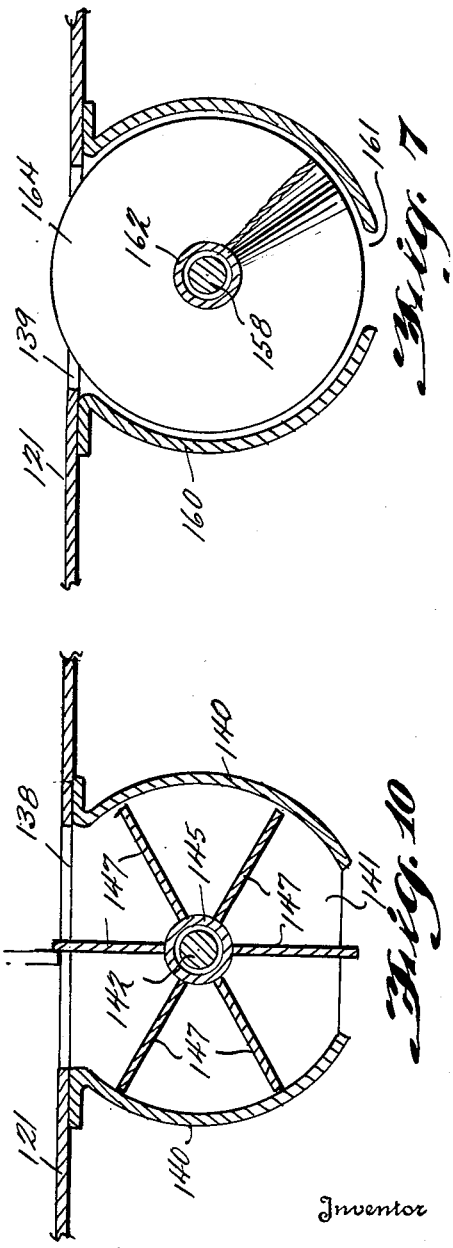

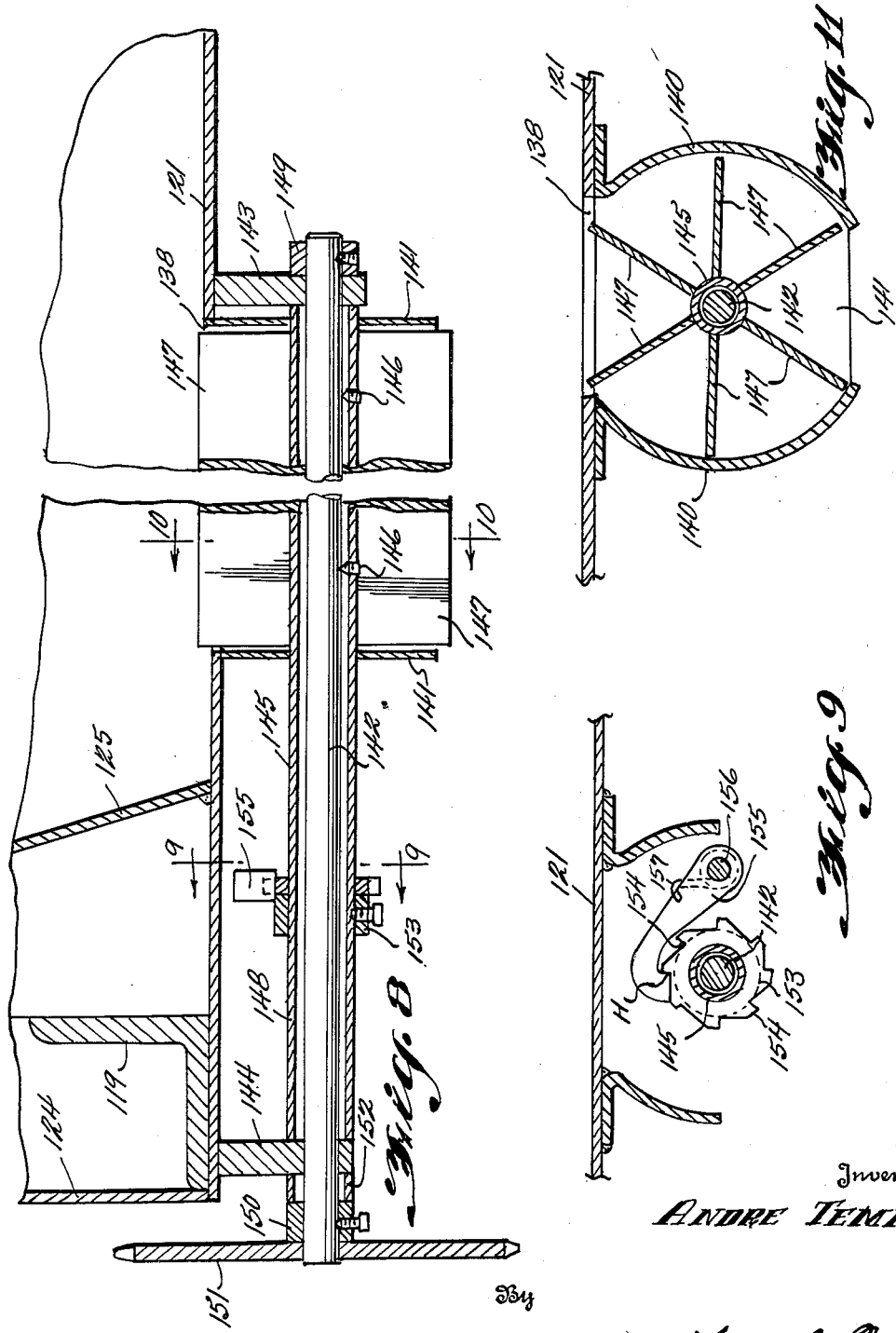

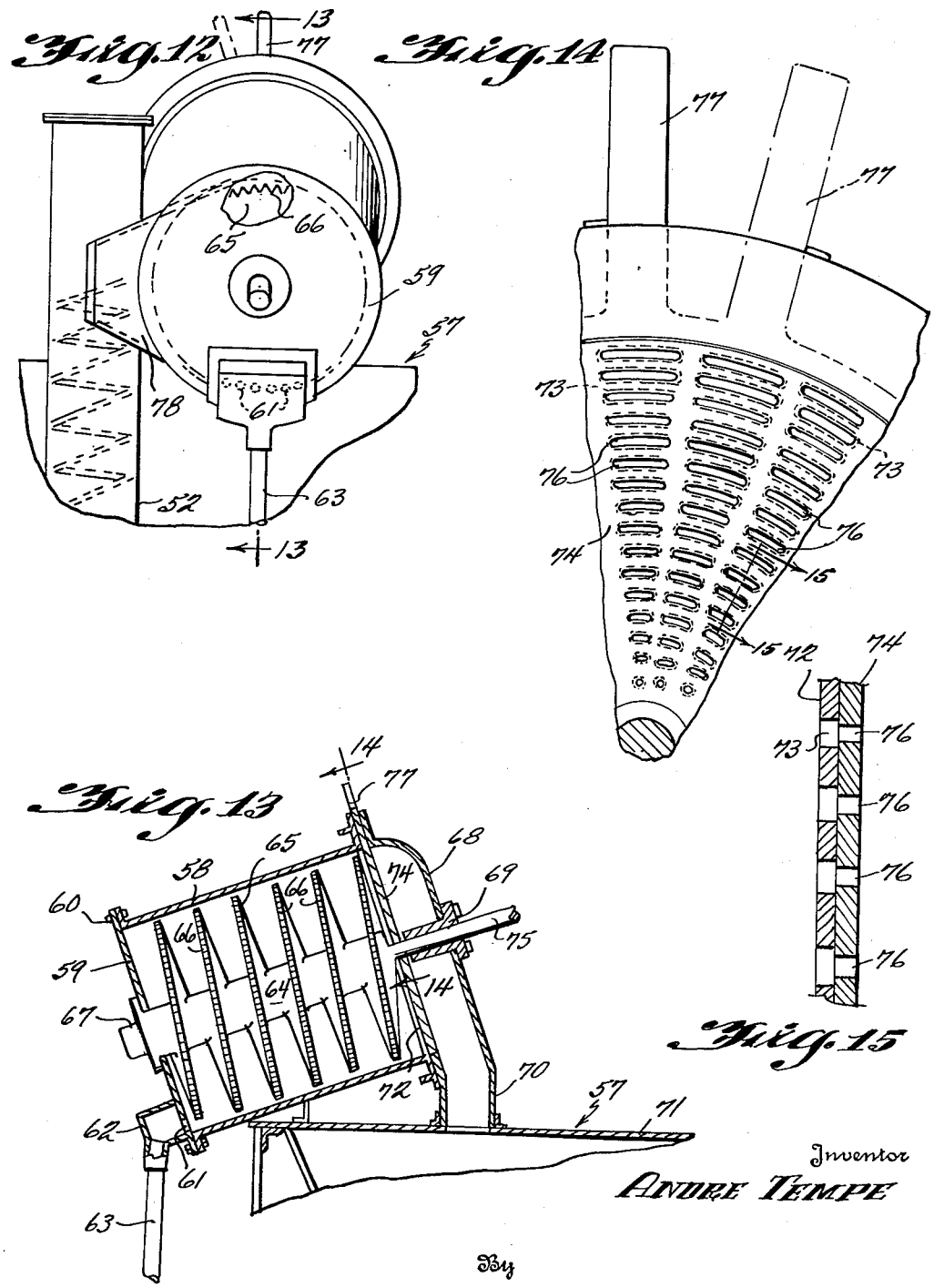

June 4, 1963
A. TEMPE
3,092,467
APPARATUS FOR THE PRODUCTION OF FERTILIZER
FROM ORGANIC WASTE MATERIALS
Filed July 6, 1959
13 Sheets-Sheet 7
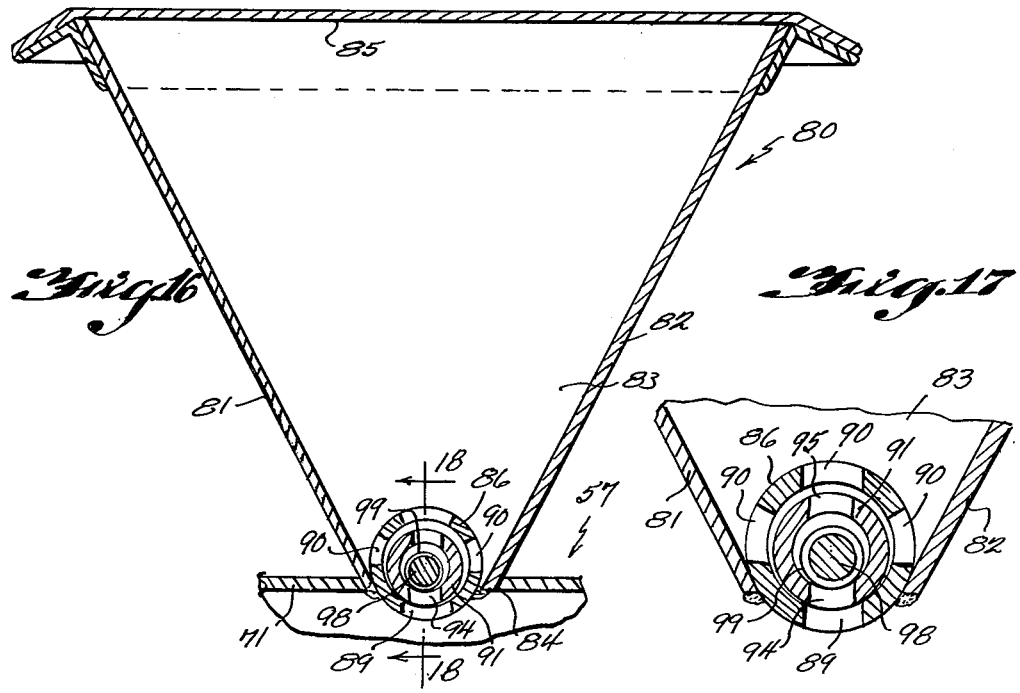
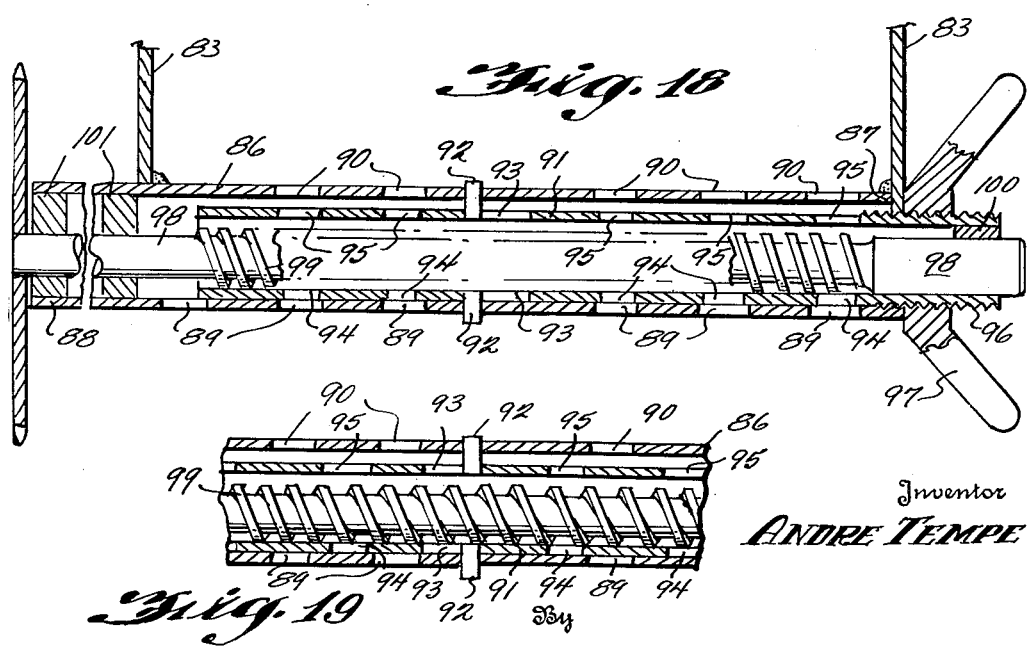
Inventor
ANDRE TEMPE
By
Kimmel & Crowell
ATTORNEYS

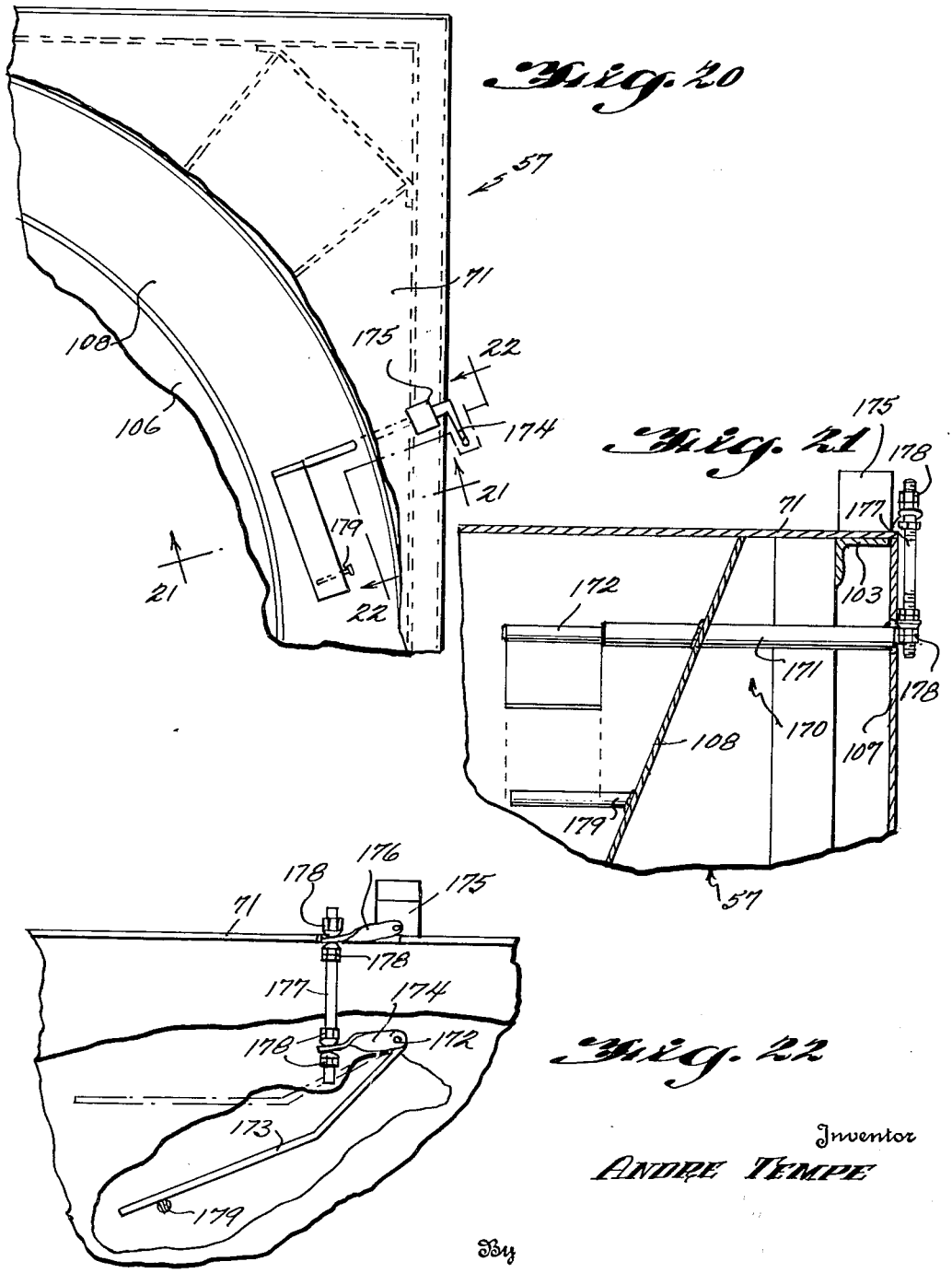

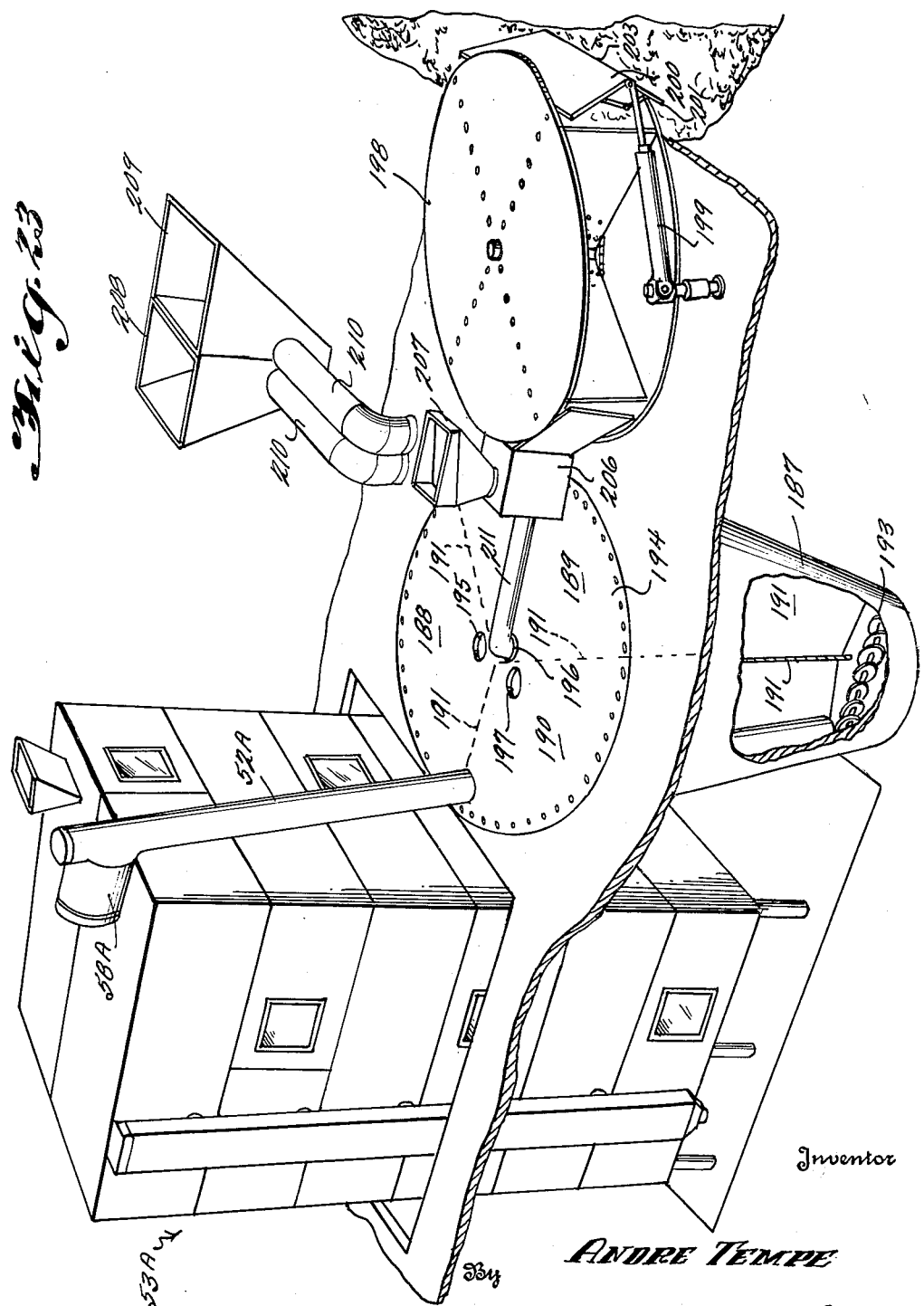

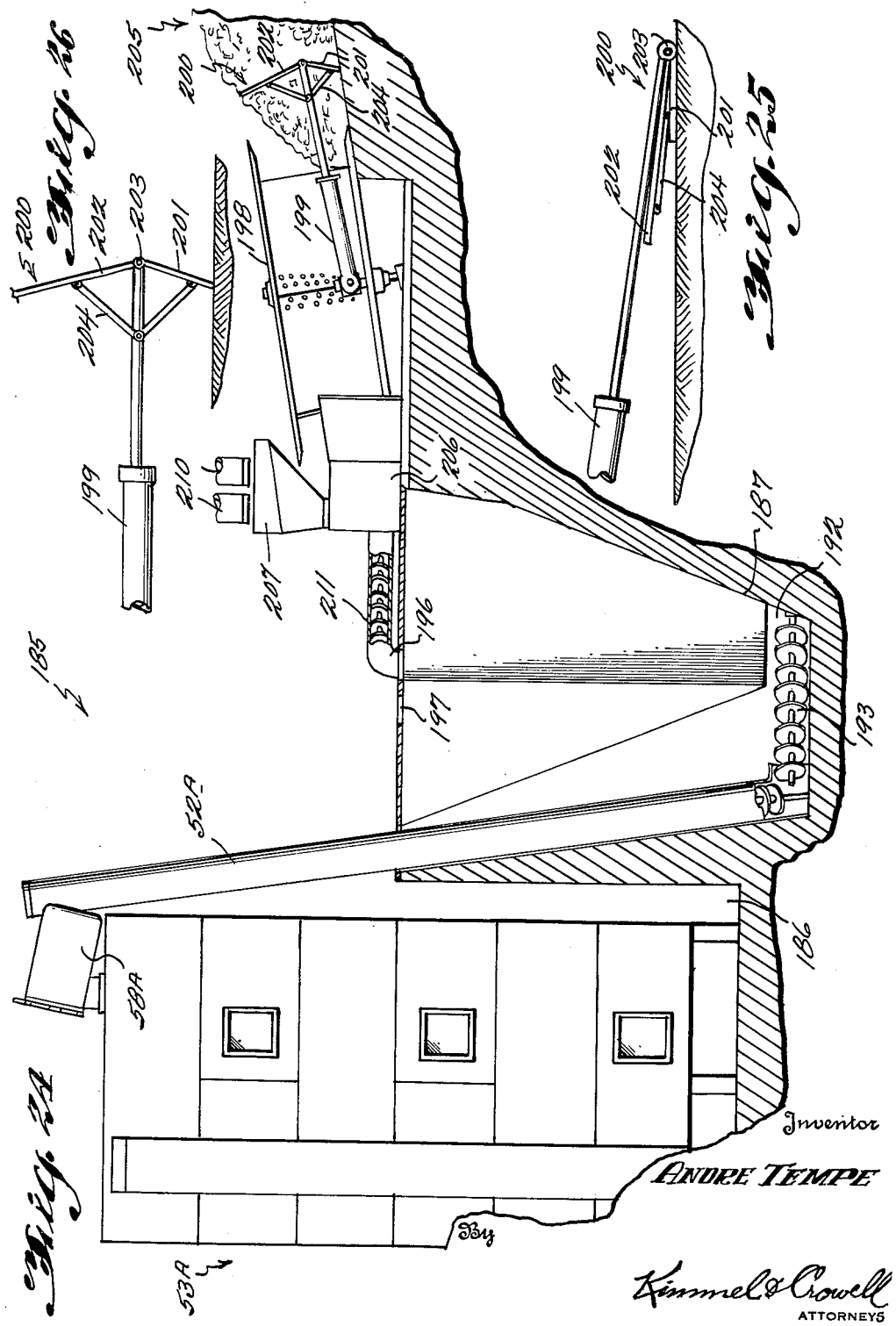

Inventor
ANDRE TEMPE

By
Kimmel & Crowell
ATTORNEYS

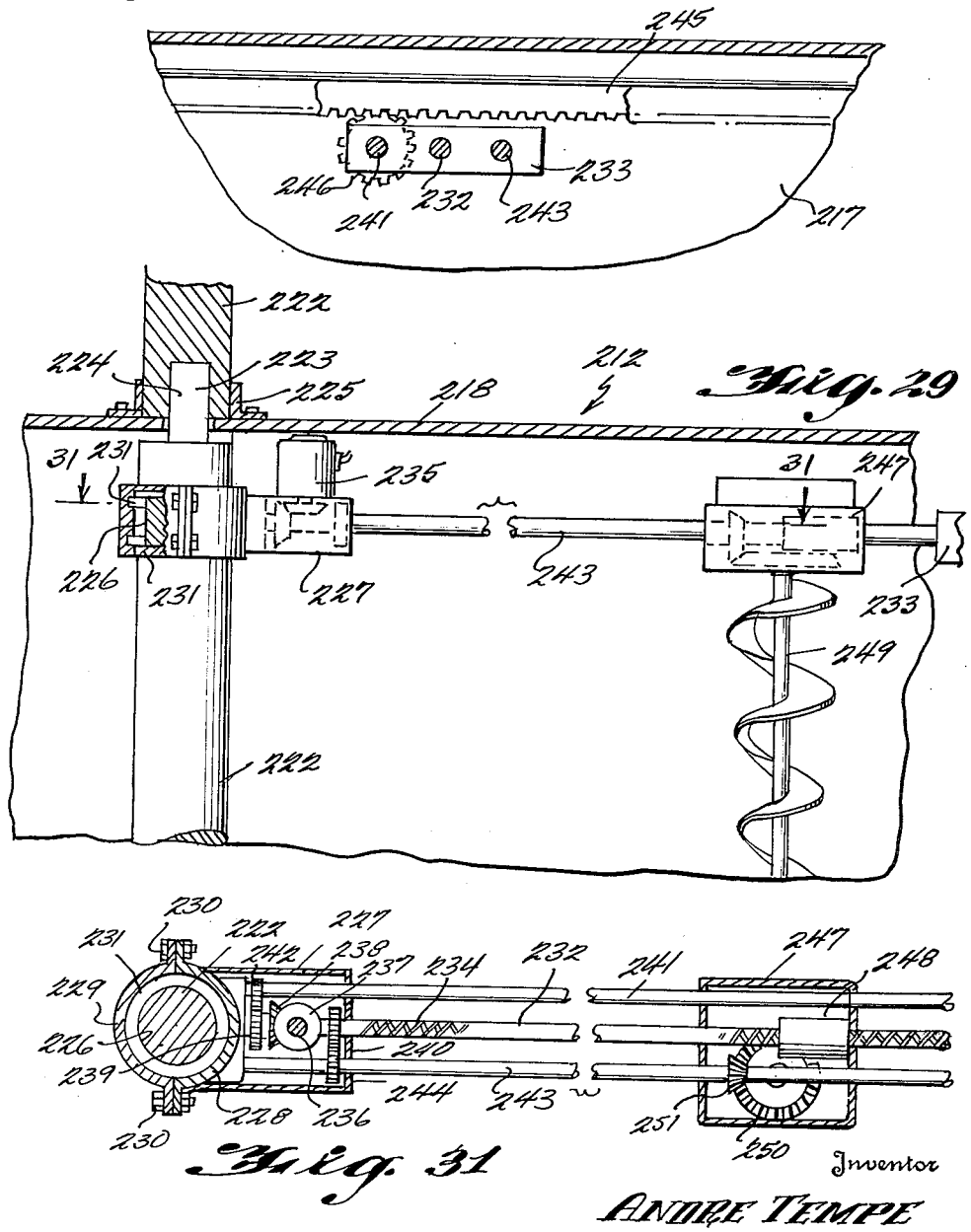

June 4, 1963

A. TEMPE 3,092,467

APPARATUS FOR THE PRODUCTION OF FERTILIZER FROM ORGANIC WASTE MATERIALS

Filed July 6, 1959

Inventor

ANDRE TEMPE

By

Kimmel & Crowell

ATTORNEYS

United States Patent Office 3,092,467
Patented June 4, 1963

3,092,467
APPARATUS FOR THE PRODUCTION OF FERTIL-
IZER FROM ORGANIC WASTE MATERIALS
Andre Tempe, P.O. Box 407, Budd Lake, N.J.
Filed July 6, 1959, Ser. No. 825,145
10 Claims. (Cl. 23—259.1)

The present invention relates to a method and apparatus for producing useful products from digestible waste materials.

The primary object of the invention is to provide a method of digesting waste materials on a continuous basis, producing useful products therefrom.

Another object of the invention is to provide an apparatus in which digestible materials are continuously converted to useful products by following a digestion method.

A further object of the invention is to provide an apparatus for treating waste materials to convert the waste materials to useful products in which means are provided for controlling the moisture content of the waste materials and the feed of the waste materials to the apparatus.

A still further object of the invention is to provide an apparatus of the class described above in which the digestion process is carried out under controlled air pressure conditions and in which either aerobic air bacteria pressure conditions and in which either aerobic or anaerobic bacteria provide the digestion element.

Another object of the invention is to provide an apparatus of the class described above which can be operated on a continuous basis with extremely limited manpower, without decreasing the efficiency of the method.

A further object of the invention is to provide a method of digesting waste materials to produce a balanced fertilizer product therefrom.

Other objects and advantages will become apparent in the following specification when considered in light of the attached drawings, in which:

FIGURE 2 is a top plan view of the top chamber with the feed mechanism removed therefrom, taken along the line 2—2 of FIGURE 1, looking in the direction of the arrows;

FIGURE 3 is a fragmentary vertical section taken of the arrows;

FIGURE 4 is a plan view of one of the central chambers taken along the line 4—4 of FIGURE 1, looking in the direction of the arrows;

FIGURE 5 is a vertical section view taken along the line 5—5 of FIGURE 4, looking in the direction of the arrows;

FIGURE 6 is an enlarged fragmentary vertical section taken along the line 6—6 of FIGURE 4, looking in the direction of the arrows;

FIGURE 7 is a fragmentary transverse section taken along the line 7—7 of FIGURE 6, looking in the direction of the arrows;

FIGURE 8 is an enlarged fragmentary vertical section taken along the line 8—8 of FIGURE 4, looking in the direction of the arrows;

FIGURE 9 is a fragmentary transverse section taken along the line 9—9 of FIGURE 8, looking in the direction of the arrows;

FIGURE 10 is a fragmentary transverse section taken along the line 10—10 of FIGURE 8, looking in the direction of the arrows;

FIGURE 11 is a view similar to FIGURE 10 illustrating the elements in a different position of rotation;

FIGURE 12 is an enlarged fragmentary side elevation of the feed mechanism;

FIGURE 13 is a fragmentary vertical sectional view taken along the line 13—13 of FIGURE 12, looking in the direction of the arrows;

FIGURE 14 is an enlarged fragmentary transverse section taken along the line 14—14 of FIGURE 13;

FIGURE 15 is an enlarged fragmentary vertical section taken along the line 15—15 of FIGURE 14;

FIGURE 16 is an enlarged fragmentary vertical section taken along the line 16—16 of FIGURE 1;

FIGURE 17 is a grossly enlarged view similar to FIGURE 16;

FIGURE 18 is an enlarged fragmentary longitudinal vertical section taken along the line 18—18 of FIGURE 16;

FIGURE 19 is a view similar to FIGURE 18 with the parts in a different position;

FIGURE 20 is a fragmentary top plan view of the top chamber illustrated in FIGURE 2;

FIGURE 21 is an enlarged fragmentary vertical section taken along the line 21—21 of FIGURE 20, looking in the direction of the arrows;

FIGURE 22 is a fragmentary vertical section taken along the line 22—22 of FIGURE 20, looking in the direction of the arrows;

FIGURE 23 is a fragmentary perspective view of a modified form of the invention;

FIGURE 24 is a side elevation shown partially broken away and in section of the modification illustrated in FIGURE 23;

FIGURE 25 is a fragmentary side elevation of the feed mechanism in closed position;

FIGURE 26 is a view similar to FIGURE 25 of the feed mechanism in open position;

FIGURE 29 is a side elevational view of the agitator mechanism of FIGURE 27, shown partially broken away and in section for convenience of illustration;

FIGURE 30 is an enlarged fragmentary vertical section taken along the line 30—30 of FIGURE 27, looking in the direction of the arrows;

FIGURE 31 is a fragmentary horizontal sectional view taken along the line 31—31 of FIGURE 29, looking in the direction of the arrows.

Figure 1:
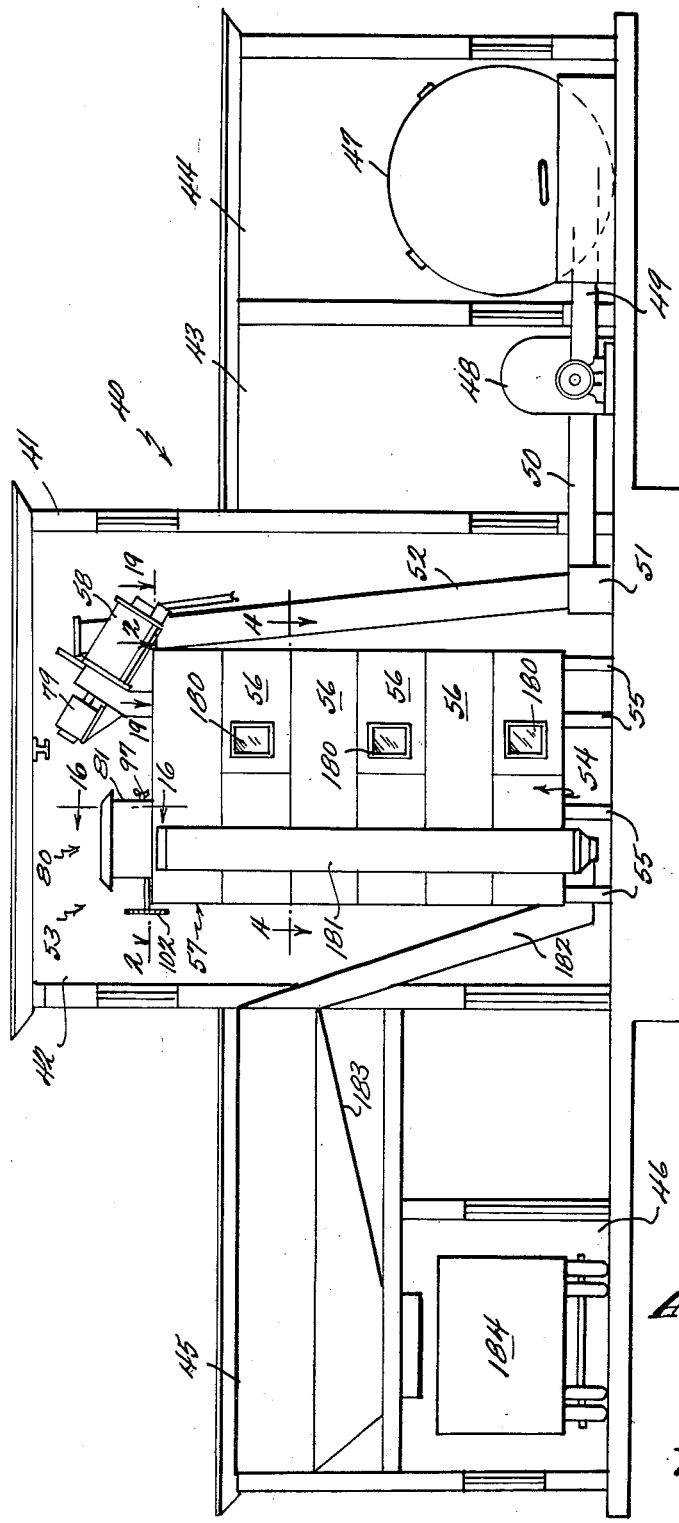
FIGURE 1 is a side elevation of the invention with the building shown in vertical section.

Referring now to the drawings in detail wherein like reference characters indicate like parts throughout the several figures, and with particular reference to FIGURES 1 through 22 wherein is illustrated the preferred form of the invention, the reference numeral 40 indicates generally a digesting apparatus constructed in accordance with the invention.

The digesting apparatus 40 is positioned in a building 41 having a digester room 42, a grinder room 43, a receiving room 44, a product storage room 45, and a product delivery room 46.

The receiving room 44 has a tank 47 positioned therein to receive the waste materials to be used in the process. Non-digestible solids, such as metal, glass, stone and the like, are removed from the waste materials in the tank 47 by conventional means, not shown. A grinder 48 is positioned in the grinder room 43 and is connected to the tank 47 by a conveyor 49. The grinder 48 is of conventional structure and reduces the waste material to a fine state. A conveyor 50 extends from the grinder 48 into the digester room 42, terminating in a hopper 51. A vertical screw conveyor 52 has its lower end mounted in the hopper 51 and extends upwardly therefrom in the digester room 42.

A digester, generally indicated at 53, is positioned in the digester room 42 and includes a bottom tank 54 supported on a plurality of legs 55. A plurality of intermediate tanks 56 are arranged in superposed stacked relation on the bottom tank 54 and have a top tank 57 supported on the upper end thereof.

A cylindrical chamber 58 is supported on the top of the top tank 57 with its axis sloping upwardly and inwardly with respect to the top tank 57. The cylindrical chamber 58 has an outer end wall 59 releasably secured to the end of the chamber 58 by a plurality of fastening elements 60. The end wall 59 is provided with a plurality of ports 61 adjacent the lowest point of the end wall 59, with the ports 61 opening into a fitting 62 secured to the outer face of the end wall 59. A drain pipe 63 depends from the fitting 62 and extends to a convenient point of discharge. A combined conveyor and press 64 is positioned in the chamber 58 and has a helical screw blade 65 provided with notches 66 in the peripheral edge thereof. A bearing 67 is mounted on the end wall 59 and journals one end of the combined conveyor and press 64.

The opposite end of the cylindrical chamber 58 has an inner end wall 68 extending transversely thereof and carrying a bearing 69 in which the opposite end of the combined conveyor and press 64 is journalled. A conduit 70 depends from the lowest point of the upper inner end of the cylindrical chamber 58 and has its lower end secured to the top wall 71 of the top tank 57. A circular baffle 72 is mounted in transversely extending relation in the inner end of the cylindrical chamber 58 closely adjacent the inner end of the combined conveyor and press 64. The baffle 72 has a plurality of apertures 73 arranged therein, for reasons to be assigned. A second circular baffle 74 is positioned in engagement with the inner face of the baffle 72, as illustrated in FIGURE 15, and is journalled on the shaft 75 extending from the inner end of the combined conveyor and press 64. The second baffle 74 has a plurality of apertures 76 formed therein and arranged to have varying registry with the apertures 73 of the first baffle plate 72 upon rotation of the second baffle plate 74.

A handle 77 is formed on the second baffle plate 74 to permit the ready adjustment of the second baffle plate 74 with respect to the first baffle plate 72.

The upper end of the screw conveyor 52 is connected to the outer end of the cylindrical chamber 58 by means of a conduit 78 so that material moving upwardly through the screw conveyor 52 from the hopper 51 will pass into the outer end of the cylindrical chamber 58. The combined conveyor and press 64 is rotated by an electric motor 79 with the helical screw blade 65 turning in a direction to move the material from the outer end of the cylindrical chamber 58 toward the inner end thereof. The material moved by the combined conveyor and press 64 is forced through the apertures 73 and through the apertures 76 so as to squeeze a portion of the water content of the material out of the material before it passes through the conduit 70. The notches 66 in the peripheral edge of the helical screw blade 65 permit the water squeezed from the material to flow in a reverse direction toward the outer end of the cylindrical chamber 58 where it passes through the ports 61 and outwardly through the drain pipe 63. By adjusting the baffle plate 74 with respect to the baffle plate 72, the effective area of the apertures 73, 76 is varied so that the water content of the material moving therethrough can be rigidly controlled.

A feed hopper, generally indicated at 80, is supported on the top wall 71 of the top tank 57 and has a pair of downwardly converging side walls 81, 82 connected by a pair of end walls 83. The lower ends of the side walls 81, 82 are positioned in a generally rectangular opening 84 in the top wall 71 of the top tank 57. A cover 85 is supported in sealing relation on the upper edges of the converging side walls 81, 82 and the pair of end walls 83 to prevent the entrance of air into the hopper 80. An elongated tubular pipe 86 is positioned between and welded to the lower ends of the converging side walls 81, 82, as seen in FIGURES 16 and 17, with one end 87 terminating at one of the end walls 83 and the opposite end 88 extending beyond the opposite end wall 83 to a point slightly beyond the top wall 71 of the top tank 57. The pipe 86 is provided with a plurality of apertures 89 arranged along the underside thereof in generally longitudinally aligned relation. The apertures 89 communicate the hollow pipe 86 with the top tank 57. Additional apertures 90 are formed in the pipe 86 extending therethrough to communicate the hopper 80 with the hollow center of the pipe 86.

A tubular slide valve 91 is positioned in the pipe 86 for longitudinal sliding movement therein. The valve 91 is eccentrically positioned in the pipe 86 against the bottom thereof, completely overlying the apertures 89. A pair of pins 92 are fixedly mounted in the pipe 86 extending radially inwardly thereof in aligned relation to engage in a pair of longitudinal slots 93 formed centrally on the valve 91. The valve 91 has a plurality of apertures 94 formed therein along the lower edge thereof, arranged to be aligned with the apertures 89 in one position of the valve 91, as shown in FIGURE 18, and to be out of alignment with the apertures 89 in another position of the valve 91, as seen in FIGURE 19. The valve 91 is further provided with a plurality of apertures 95 arranged in general alignment with the apertures 94 and arranged to underlie a portion of the apertures 90 with the valve 91 in the position illustrated in FIGURE 18. The valve 91 is externally screw-threaded at 96 at the end thereof corresponding to the end 87 of the pipe 86. A hand wheel 97 is threaded on to the threads 96 of the valve 91 so that rotation of the hand wheel 97 will move the valve 91 within the pipe 86 to adjust the relationship of the apertures 94 with respect to the apertures 89.

A shaft 98, having an external screw thread 99 formed thereon, is positioned in the valve 91 in eccentric relation thereto in engagement with the bottom portion thereof. An eccentric bearing 100 is mounted in the threaded end 96 of the valve 91 with the shaft 98 journalled therein. Eccentric bearings 101 are mounted in the pipe 86 at the end 88 thereof with the shaft 98 journalled therein, as shown in FIGURE 18.

A sprocket gear 102 is rigidly secured to the end of the shaft 98 which extends beyond the end 88 of the pipe 86 so that the shaft 98 and the screw 99 can be rotated to feed material from the valve 91 through the apertures 94, 89 when in aligned or partially aligned relation.

The hopper illustrated in FIGURES 16 through 19 is driven by a conventional electric motor (not shown) and will dispense dry, finely divided material therefrom in controlled amounts upon rotation of the shaft 98 and adjustment of the valve 91 with respect to the pipe 86. The cover 85 permits the dispensing of material from the hopper 80 into the top tank 57 without admitting air to the top tank 57.

The top tank 57, indicated in detail in FIGURES 2 and 3, includes an upper, generally rectangular angle iron frame 103 and a lower, generally rectangular angle iron frame 104. The frames 103, 104 are arranged in spaced parallel relation and are connected by angle iron upright members 105 adjacent each corner thereof. A generally rectangular bottom wall 106 is secured to the underside of the frame 104 and a generally rectangular top wall 71 is secured to the top of the frame 103. Upstanding side walls 107 are supported at their upper and lower edges by the frames 103, 104 respectively and extend in sealing relation between the top wall 71 and the bottom wall 106. A downwardly and inwardly sloping semi-conical inner side wall 108 is positioned centrally on and secured to the bottom wall 106 and is secured to the top wall 71 forming an air-tight chamber 109 between the side walls 107 and the inner side wall 108, completely surrounding the inner side wall 108. The inner side wall 108, the bottom wall 106 and the top wall 71 form an air-tight compartment 110 completely separate from the compartment 109.

A vertical shaft 11 extends centrally of the compartment 110 and has its upper end journalled in a bearing 112 mounted on the underside of the top wall 71. A drive housing 113 is secured to the underside of the bottom wall 106 with the shaft 111 projecting therein. An electric motor 114 is mounted on the bottom wall 106 adjacent one corner thereof and is arranged to drive the shaft 111 through a belt 115 and pulley 116 mounted on the lower end of the shaft 111. A pair of arcuate downwardly and outwardly tapering blades 117 are secured to the shaft 111 and extend outwardly therefrom to a point just within the lower edge of the inner side wall 108.

In FIGURES 4 and 5 the intermediate tanks 56 are disclosed in detail and with exception of the legs 55 and the discharge mechanism thereof, are identical to the bottom tank 54. The tank 56 includes an upper, generally rectangular angle iron frame 118 arranged in generally horizontal relation and a generally rectangular angle iron lower frame 119 parallel to the frame 118 and spaced therebelow. The frames 118, 119 are connected by a plurality of upright corner posts 120 extending therebetween. A bottom wall 121 of generally rectangular form is secured to the underside of the bottom frame 119 in horizontally extending relation. A generally rectangular top wall 122 is secured to the upper side of the top frame 118 in parallel relation to the bottom wall 121. The top wall 118 has a relatively large central circular opening 123 formed therein. The top wall 122 and the bottom wall 121 are connected by a plurality of upright side walls 124 engaging the sides of the frames 118, 119. A semi-conical inner side wall 125 tapers inwardly and downwardly and has its lower edge 126 secured to the bottom wall 121 centrally thereon. The upper edge 127 of the semi-conical inner wall 125 is seated in the opening 123 in the top wall 122 and is secured thereto. The top wall 122, bottom wall 121, side walls 124 and semi-conical side wall 125 form a sealed air space 128 surrounding the semi-conical inner side wall 125. A vertical shaft 129 is positioned centrally of the semi-conical inner side wall 125 and is journalled in a bearing 130 mounted centrally on the bottom wall 121. The shaft 129 extends below the bottom wall 121 into a drive case 131.

A motor 132 is mounted on the bottom wall 121 to drive the shaft 129 through a belt 133 engaging a sprocket 134 mounted on the shaft 129 in the drive case 131. A pair of transverse shafts 135 have their inner ends secured to the shaft 129 by a fitting 136. The shafts 135 are arranged in axially aligned horizontal relation and have a plurality of oppositely extending sloping blades 137 secured thereto in radially spaced relation for angular and radial adjustment on the shafts 135. The blades 137 are positioned to agitate the contents of the tank 56 upon rotation of the shaft 139. The bottom wall 121 of the tank 56 and the bottom wall 106 of the tank 57 have generally rectangular oppositely disposed, radially extending discharge openings 138, 139 formed therein. A pair of spaced semi-cylindrical walls 140 are secured to the underside of the bottom wall 121 on opposite sides of the generally rectangular opening 138. A pair of end walls 141 connect the opposite ends of the generally cylindrical walls 140 and are arranged in depending relation with respect to the bottom wall 121.

A generally horizontal shaft 142 extends centrally of the generally cylindrical walls 140, having one end thereof journalled in a bearing 143 secured in depending relation to the bottom wall 121 at the inner end of the rectangular opening 138. The opposite end of the shaft 142 is journalled in a bearing 144 depending from the bottom wall 121 adjacent the side edge thereof. A tubular hub 145 is positioned concentrically around the shaft 142 extending from the bearing 143 to a point intermediate the outer end wall 141 and the bearing 144. The tubular hub 145 is secured to the shaft 142 by a plurality of set screws 146. A plurality of longitudinally extending vanes 147 are arranged in circumferentially equi-spaced, radially extending relation with their inner ends rigidly secured to the tubular hub 145. The vanes 147 upon rotation of the hub 145 have their outer ends successively extending through the opening 138 to a point slightly above the upper surface of the bottom wall 121, as illustrated in FIGURE 10. Upon further rotation of the hub 145 and the vanes 147, the vanes 147 move to the position illustrated in FIGURE 11 with all of the vanes 147 below the top surface of the bottom wall 121.

A tubular spacer 148 is positioned between the bearing 144 and the outer end of the tubular hub 145 to prevent end-wise movement of the tubular hub 145. A collar 149 is secured to the inner end of the shaft 142 for engagement with the bearing 143 and a hub 150 of a sprocket wheel 151 is secured to the opposite end of the shaft 142. A tubular spacer 152 encompasses the shaft 142, spacing the hub 150 from the bearing 144 to eliminate end-wise movement of the shaft 142. A circular one-way rack 153 is secured to the outer end of the tubular hub 145 and has a plurality of peripheral teeth 154 formed thereon. A locking pawl 155 is journalled on a shaft 156 parallel to the shaft 142 and is biased by a spring 157 so that a hook H at the outer end thereof will engage the teeth 154, limiting rotation of the tubular hub 145 to one direction.

Underlying the generally rectangular opening 139 is a generally horizontal radially extending shaft 158 journalled in a pair of bearing end walls 159 secured in depending relation to the bottom wall 121 at opposite ends of the generally rectangular opening 139. A semi-cylindrical housing 160 is secured to the underside of the bottom wall 121 on opposite sides of the opening 139 and is supported at its opposite ends by the bearings 159. The housing 160 has an elongated, generally rectangular opening 161 formed at the bottom thereof underlying the generally rectangular opening 139. A tubular hub 162 is secured to the shaft 158 by set screws 163 and extends between the bearings 159. A helical screw blade 164 is mounted on the tubular hub 162 and is contained within the housing 160. A collar 165 is secured to the inner end of the shaft 158 for engagement with the inner bearing 159. A hub 166 of a sprocket wheel 167 is secured to the outer end of the shaft 158, as can be seen in FIGURE 6. A bearing 168 is secured in depending relation to the underside of the bottom wall 121 adjacent the side edge thereof and journals the outer end of the shaft 158 therein. A tubular spacer 169 encompasses the shaft 158 between the hub 166 and the bearing 168 to maintain the shaft 158 against end-wise movement.

In FIGURES 20 through 22, a control for the in-put of material to the top tank 57 is illustrated generally at 170. A generally horizontal tubular bushing 171 extends through the side wall 107 and the semi-conical inner side wall 108, being welded to each in sealed relation. A shaft 172 is journalled in the tubular bushing 171 and has a laterally extending plate 173 rigidly secured to the inner end thereof. A crank 174 is secured to the outer end of the shaft 172, as can be clearly seen in FIGURE 22. A micro-switch 175 is mounted on the top wall 71 and has a crank 176 extending laterally therefrom, generally parallel to the crank 174 and overlying the crank 174. A connecting rod 177 has its opposite ends connected to the cranks 174, 176 by means of nuts 178. A stop pin 179 is secured to the inner side wall 108 and extends radially inwardly therefrom in generally horizontal relation to support the lower end of the blade 173 limiting the downward movement thereof. As material rises in the tank 57 within the confines of the generally conical wall 108, the blade 173 is raised, rotating the shaft 172 actuating the micro-switch 175 so as to stop the flow of material into the top tank 57. As material flows from the top tank 57 through the openings 138 and/or 139, the level will fall therein permitting the blade 173 to fall, actuating the micro-switch 175 to again supply material to the top tank 57. The tanks 54, 56 and 57 are provided with windows 180 by means of which the contents thereof may be viewed during the operation of the apparatus. An air supply conduit 181 extends vertically alongside of the digester 53 communicating with the spaces 109 and 128 in each of the tanks 54, 56, 57. An additional air conduit (not shown) also extends vertically on the opposite side of the digester 53 also communicating with the spaces 109, 128 in the tanks 54, 56, 57. Air is circulated from one air conduit 181 to the opposite conduit around the spaces 109, 128 to serve as a heat exchange medium for the material in the tanks 54, 56, 57.

A conveyor 182 extends from the underside of the bottom tank 54 conveying the discharged material from the bottom tank 54 to a hopper 183 positioned in the hopper room 45. The material from the hopper 183 is dropped into truck bodies 184 which are moved into underlying position with respect to the hopper 183. The tanks 54, 56, 57 are mounted in superposed relation with each tank being sealed to the tank thereabove so that the space encompassed by the semi-conical inner side walls 108, 125 can be maintained at sub-atmospheric pressures.

In the use and operation of the invention, vegetable waste material such as garbage, tree bark and the like, is dumped into the receiving tank 47 and has non-digestible material separated therefrom. The waste material from the tank 47 then moves over the conveyor 49 to the grinder 48 where it is reduced to a uniform size. The material then moves from the grinder 48 through a conveyor 50 to a hopper 51 from which it is fed vertically by a screw conveyor 52 which terminates at the cylindrical chamber 58. The combined conveyor and press 64 presses the material through the apertures 73, 76 so as to remove excess water therefrom and the material passes through the conduit 70, through the top wall 71 into the top tank 57. Either anaerobic or aerobic bacteria contained in the feed hopper 80 is fed into the top tank 57 through the tubular pipe 86, slide valve 91 and screw threaded shaft 98. The quantity of bacteria fed from the hopper 80 is controlled as described above. The mixture of the material with the bacteria is agitated by the agitator blades 117 and due to the digestion action of the bacteria on the material, the temperature in the top tank 57 rises from an incoming temperature of approximately 70 degrees to a discharge temperature of approximately 92 degrees Fahrenheit. When the material in the top tank 57 reaches the desired temperature, the vanes 147 are rotated to move the material in the top tank 57 into the tank 56 underlying the top tank 57. The action of the bacteria with the material increases the temperature in each successively lower tank until a maximum temperature of approximately 145 degrees F. to 160 degrees F. is reached. The next lower tanks successively cool the material therein until the discharge temperature of 85 to 90 degrees Fahrenheit is reached in the bottom tank 54.

The screw conveyors 164 in each of the tanks provide means whereby the tank may be dumped quickly into the next successive tank therebelow should the temperature in any one tank become too great.

The supply of air into the tanks internally of the semi-conical inner side walls 108, 125 is rigidly controlled to maintain the action of the bacteria to the desired degree. The heat of the material in each of the tanks, as well as the moisture content of the incoming material, are also closely coordinated to maintain the optimum efficiency of the process.

In FIGURES 23 through 26 a modified digesting apparatus, indicated generally at 185, is illustrated.

In the digester apparatus 185, a pit 186 is provided to contain a digester 53A identical to the digester 53. A cylindrical feed chamber 58A is mounted on top of the digester 53A and is fed by a vertical screw conveyor 52A in the same manner as the screw conveyor 52 feeds the chamber 58 in the preferred form of the invention.

A semi-conical pit 187 is positioned adjacent the pit 186 and is divided into three compartments 188, 189 and 190 by a plurality of radially extending vertical partitions 191. A single compartment 192 underlies the compartments 188, 189, 190 and has a horizontal screw conveyor 193 positioned therein. The screw conveyor 193 is arranged to feed material to the lower end of the upright screw conveyor 52A with the material flowing successively from the compartments 188, 189, 190 which are emptied in rotation.

The pit 187 is closed by a circular cover 194 having filling openings 195, 196, 197 formed therein communicating respectively with the compartments 188, 189, 190.

A horizontal compartmented wheel 198 is positioned adjacent the pit 187 and has a pair of spaced parallel hydraulic rams 199 arranged on opposite sides thereof. A folding scraper blade 200 is operatively connected on opposite sides to the rams 199 and is adapted to be horizontally reciprocated thereby.

The scraper 200 includes a lower blade 201 and an upper blade 202 hingedly secured to the lower blade 201 along a horizontal juncture line 203. The lower blade 201 is somewhat shorter than the upper blade 202 and the blades are connected by links 204 to limit the spread of the blades 201, 202. The scraper 200 is reciprocated by the hydraulic rams 199 so that as the scraper 200 is moved away from the wheel 198, the blades 201, 202 are collapsed together, as seen in FIGURE 25, to permit the scraper to be forced into a material supply pile 205. The rams 199 are then actuated in the opposite direction, pulling the scraper 200 toward the wheel 198 whereupon the plates 201, 202 separate to the position shown in FIGURE 24 and a portion of the material supply pile 205 is pulled into one of the compartments of the compartmented wheel 198. The scraper 200 when forcing material into a compartment of the wheel 198 squeezes excess moisture from the material. The wheel 198 is then rotated 90 degrees and the action of the scraper 200 is repeated to fill the next compartment. When a filled compartment has rotated 180 degrees from the scraper 200, it communicates with a transfer chamber 206 positioned adjacent the pit 187. Material in the compartments of the compartmented wheel 198 moves into the transfer chamber 206 when in alignment therewith.

A hopper 207 is connected to the top of the transfer chamber 206, as is clearly shown in FIGURES 23 and 24. A pair of supply hoppers 208, 209 are arranged in laterally spaced relation to the hopper 207 and have a pair of feed conduits 210 extending respectively therefrom to feed material into the hopper 207. Additives to supply missing components from the material supply pile 205 are contained in the hoppers 208, 209 and are added to the material of the material supply pile 205 in the transfer chamber 206.

A screw conveyor 211 extends from the transfer chamber 206 and is adapted to be communicated respectively with the inlet openings 195, 196, 197 in the cover 194.

The digester 53A is identical to the digester 53 and the modification illustrated in FIGURES 23 through 26 provides means for feeding digestable material other than garbage into the digester 53A, while at the same time adding other materials thereto, supplying deficiencies in the basic material.

In FIGURES 27 and 29 through 31 a tank, indicated generally at 212, is illustrated. The tank 212 may replace any of the tanks 54, 56, 57 in the digester 53 or the digester 53A as required.

Figure 27:
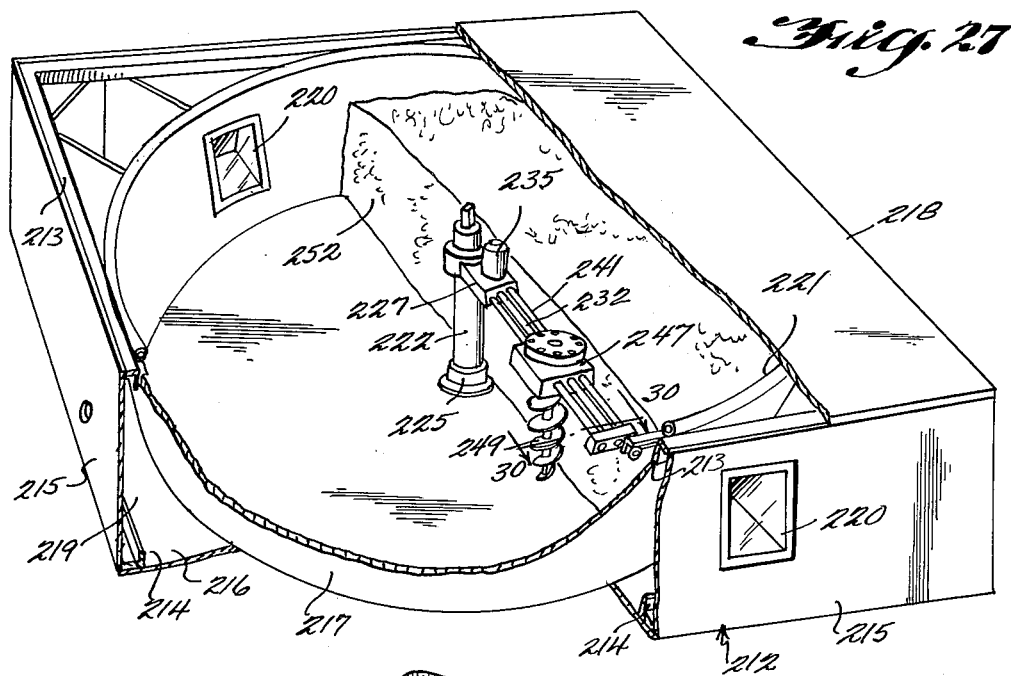
FIGURE 27 is a fragmentary perspective view of one of the chambers of the modification illustrated in FIGURE 23 shown partially broken away and in section for convenience of illustration.

The tank 212 has a generally rectangular upper angle iron frame 213 and a generally rectangular lower angle iron frame 214, arranged in underlying relation thereto. Upright side walls 215 extend between and connect the frames 213, 214, as can be seen in FIGURE 27. A generaly rectangular bottom wall 216 is secured to the underside of the lower rectangular frame 214 and supports on its upper surface a semi-conical inner side wall 217 extending in upwardly and outwardly flaring relation therefrom. A generally rectangular top wall 218 is arranged in engagement with the upper surface of the upper rectangular frame 213 parallel to the bottom wall 216. The side walls 215, the semi-conical inner side wall 217, bottom wall 216 and top wall 218 form therebetween a chamber 219 which is air-tight and completely encompasses the inner side wall 217. Windows 220 open through the side walls 215 and the inner side wall 217 to permit observation of the process as it develops. A fluorescent tube 221 is mounted in the tank 212 at the upper edge of the inner side wall 217 and is of a type which will emit rays beneficial to the growth of bacteria within the tank 212 during the operation of the process therein.

A shaft 222 extends vertically upwardly from the center of the bottom wall 216 and is provided with a reduced upper end 223 projecting into a socket 224 formed in the next succeeding shaft 222 thereabove. A fitting 225 secures the shaft 222 to the wall 216.

The shaft 222 has a circumferential groove 226 formed therein adjacent the upper end thereof.

A housing 227 has a semi-cylindrical portion 228 at one end thereof. A semi-cylindrical collar 229 is positioned in opposed relation to the semi-cylindrical portion 228 of the housing 227. Bolts 230 secure the collar 229 to the semi-cylindrical portion 228 encompassing the shaft 222 at the circumferential groove 226. Vertically spaced bearings 231 support the housing 227 and collar 229 for rotation about the shaft 222.

A shaft 232 extends horizontally from the housing 227 and is journalled for rotation therein. The opposite end of the shaft 232 is supported in a horizontal bracket 233 arranged adjacent the inner side wall 217. The shaft 232 is reversely threaded at 234 throughout its length, for reasons to be assigned. An electric motor 235 is mounted on the housing 227 with its shaft 236 extending into the housing 227 and carrying a bevel gear 237. A bevel gear 238 on the shaft 232 is meshed with the bevel gear 237 so that rotation of the motor 235 will affect rotation of the shaft 232. The shaft 232 is also provided with spur gears 239 and 240 arranged on opposite sides of the bevel gear 238. A shaft 241 extends parallel to the shaft 232 and has its opposite ends journalled in the housing 227 and the bracket 233, respectively. A spur gear 242 on the shaft 241 meshes with the spur gear 239 so that rotation of the shaft 232 will effect rotation of the shaft 241. A shaft 243 extends parallel to the shaft 232 on the side thereof opposite the shaft 241. The shaft 243 has its opposite ends journalled in the housing 227 and the bracket 233 and carries a spur gear 244 meshing with the spur gear 240 so that rotation of the shaft 232 will affect rotation of the shaft 243. The spur gears 239, 242 and the spur gears 240, 244 may have any desired ratio so that the relative rotation of the shafts 232, 241, 243 may be completely controlled.

A ring gear 245 is mounted on the upper inner edge of the inner side wall 217 and a spur gear 246, mounted on the end of the shaft 241, is arranged in meshing relation thereto so that rotation of the shaft 241 will rotate the shafts 241, 232, 243 and the housing 227 around the shaft 222, as a unit.

A moving housing 247 is mounted for longitudinal reciprocation on the shafts 232, 241, 243 and has a nut 248 mounted therein engaging the threads 234 of the shaft 232 so that rotation of the shaft 232 will cause the movable housing 247 to reciprocate horizontally on the shafts 232, 241, 243.

A vertically disposed auger 249 is journalled in the movable housing 247 at its upper end and has a bevel gear 250 mounted on its upper end within the housing 247. A bevel gear 251 is keyed to the shaft 243, meshing with the bevel gear 250 so that rotation of the shaft 243 will rotate the auger 249 in a direction to move material coming in contact therewith upwardly away from the bottom wall 216.

In the use and operation of the mechanism illustrated in FIGURES 27, 29, 30 and 31, the auger 249 rotates about its own axis, reciprocates radially on the shafts 241, 243 and rotates about the shaft 222, completely mixing the material 252 contained within the tank 212.

Figure 28:
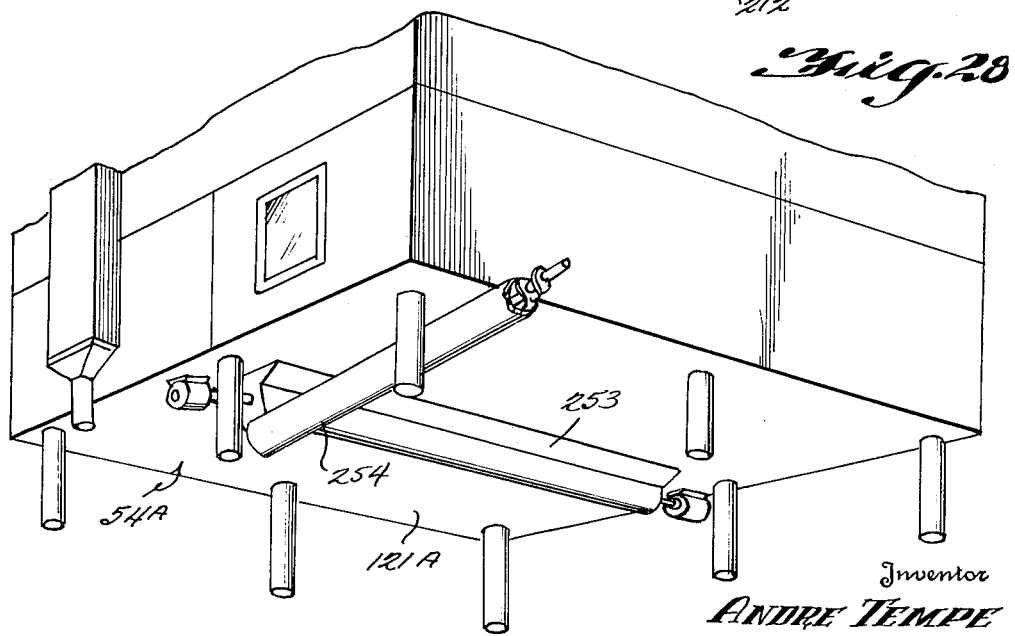
FIGURE 28 is a perspective view of the underside of the bottom chamber of the modification illustrated in FIGURE 23.

In FIGURE 28 of the drawings, a modified form of the invention is illustrated wherein a bottom tank 54A is provided with a sealed outlet to prevent the admission of air during the discharging of material therefrom. The bottom wall 121A is provided with a housing 253 which underlies the openings 138, 139 (not shown) to receive the material discharged therefrom. A transversely extending screw conveyor 254 communicates with one end of the housing 253 and transfers the material therefrom to a point of discharge. In other respects the bottom tank 54A is identical to the bottom tank 54 and may be interchanged therewith as required.

Figure 32:
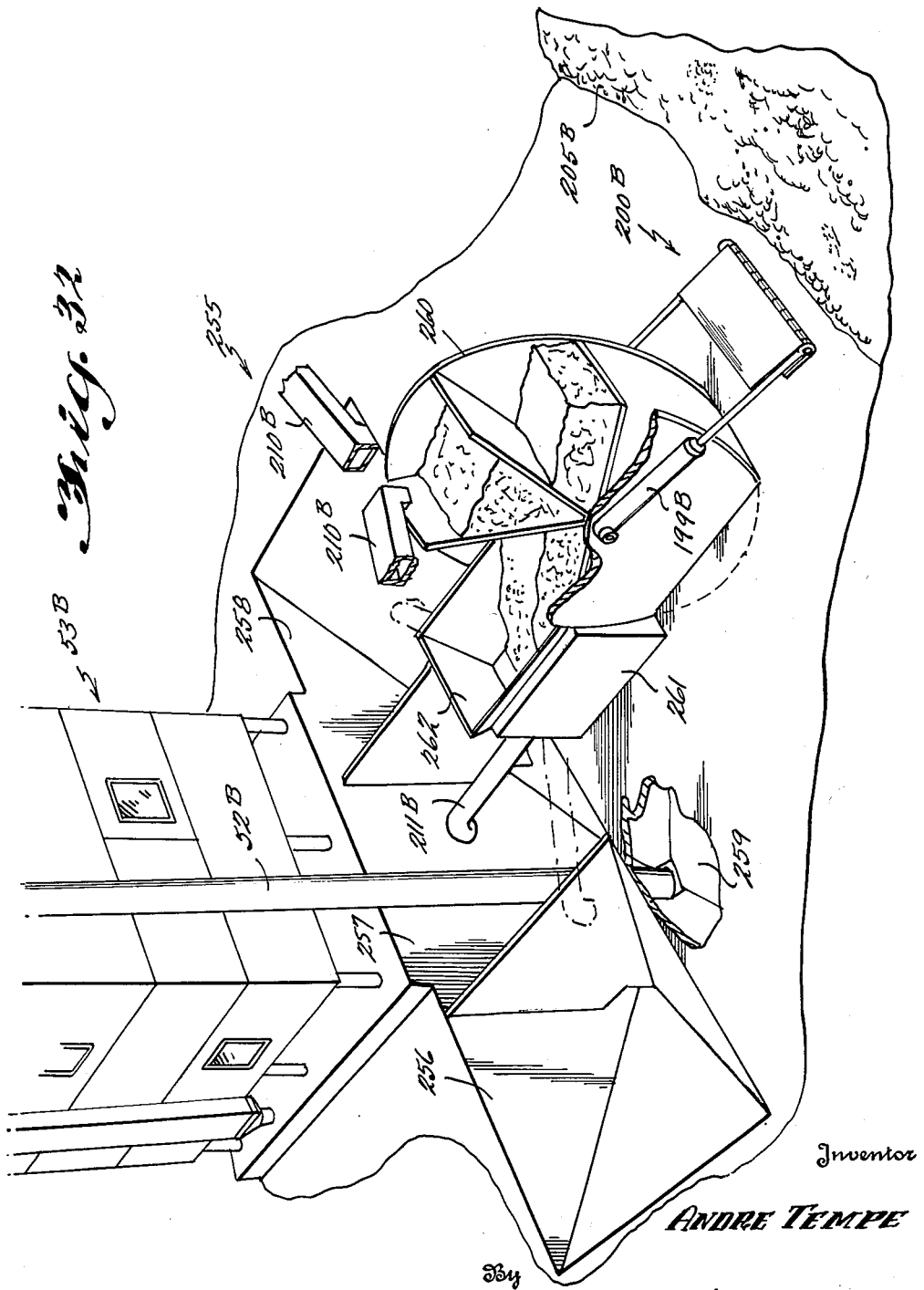
FIGURE 32 is a fragmentary perspective view of another modified form of the invention shown partially broken away and in section for convenience of illustration.

In FIGURE 32 a modified feed mechanism is illustrated generally at 255 for feeding material to a digester, generally indicated at 53B and identical in construction to the digester 53. In the feed mechanism 255 a plurality of hoppers 256, 257, 258 are arranged in laterally aligned relation, feeding into a single hopper 259 underlying each of the hoppers 256, 257, 258. A screw conveyor 52B extends from the hopper 259 to the top of the digester 53B to convey material therefrom into the digester 53B. An upright compartmented wheel 260 is mounted for rotation adjacent a transfer chamber 261 having a hopper top 262 formed thereon. A pair of hydraulic rams 199B, identical to the hydraulic rams 199, are positioned on opposite sides of the compartmented wheel 260 and have a scraper blade, generally indicated at 200B, connected thereto for operation in the identical manner of the scraper blade 200. The scraper 200B moves material from the pile 205B into the compartments of the compartmented wheel 260; rotation of the compartmented wheel 260 aligns the compartments thereof with the hopper 262 so that the material flows therein and into the transfer chamber 261.

Conduits 210B extend from additive material hoppers (not shown) so that additives may be supplied to the material 205B when found to be lacking in the essential requirements. A screw conveyor 211B extends from the transfer chamber 261 and can be swung to discharge material into a selected one of the hoppers 256, 257 or 258. The material 205B fed into the hoppers 256, 257, 258 is successively fed therefrom by the screw conveyor 52B so that the initial stages of digestion may begin to take place in the hoppers 256, 257, 258 before the material is moved into the top tank of the digester 53B.

It should be understood that the feed mechanism 255, illustrated in FIGURE 32, may be used in any of the environments of the digester 53, the digester 53A or the digester 53B as required.

*The Method*

Digestable waste material is converted to useful products in the above-described apparatus by the following method:

Waste material, such as garbage, tree bark or other digestible matter, is finely divided and has mixed therewith additives to supply a source for the necessary elements desired in the end product. The additives may also be waste material and supply such missing elements as nitrogen to tree bark when forming a nitrogen containing fertilizer as an end product.

The digestible mixture then is treated to remove excess moisture therefrom, reducing the moisture content of the mixture to a predetermined uniform level. The mixture is then maintained under controlled air pressure and is agitated after having either anaerobic or aerobic bacteria added thereto.

The bacteria begins a digesting action on the mixture and the temperature of the mixture is increased from a beginning temperature of 70 degrees F. to a maximum temperature of 160 degrees F. The digesting action is complete when the temperature reaches 160 degrees F. and the mixture then has been converted to a fertilizer of commercial importance.

The mixture is then cooled to a temperature of about 90 degrees F. and is discharged from the subatmospheric pressure.

In some cases the mixture is subjected to the rays from a fluorescent tube lamp of the type beneficial to the growth of bacteria during the digesting action, thus increasing the rate of digestion and the efficiency of the digesting process.

During the process set forth above the moisture content of the mixture, the air supply of the mixture and the developed heat of the process are all carefully controlled to maintain them within predetermined limits to avoid incomplete digestion or improper digestion wherein the desired end product would not be produced.

Having thus described the preferred embodiments of the apparatus and method, it should be understood that numerous additional modifications may be resorted to without departing from the scope of the appended claims.

What is claimed is:

1. A digester tower for the production of organic fertilizer from comminuted organic waste material comprised by a plurality of vertically ranged tower sections each having a bottom with an opening therein, a conveyor for feeding the organic waste material to the uppermost tower section, a hopper on the uppermost tower section for holding bacteria containing material, a rotary valve between the bottom of the hopper and the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

2. A digester tower for the production of organic fertilizer from comminuted organic waster material comprised by a plurality of vertically ranged tower sections each having a bottom with an opening therein, a conveyor for feeding the organic waste material to the uppermost tower section, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

3. A digester tower for the production of organic fertilizer from comminuted organic waste material comprised by a plurality of vertically ranged tower sections each having a bottom with an opening therein, a conveyor for feeding the organic waste material to the uppermost tower section, a motor for driving said conveyor, a switch for controlling the motor, a vane responsive to the level of the material in the uppermost tower section operatively connected to the switch, a hopper on the uppermost tower section for holding bacteria containing material, a rotary valve between the bottom of the hopper and the top of the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one lower tower section into the next lower tower section, means for rotating the latter valves and a conveyor for removing the organic fertilizer from the lowermost tower section.

4. A digester tower for the production of organic fertilizer from comminuted organic waste material comprised by a plurality of vertically ranged tower sections each having a bottom with an opening therein, a first conveyor for raising the organic waste material to the level of the uppermost tower section, a screw conveyor between the top of the first conveyor and the top of the uppermost tower section for receiving the organic waste material from the first conveyor and forcing same into the uppermost tower section, a hopper on the uppermost tower section for holding bacteria containing material, a rotary valve between the bottom of the hopper and the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

5. A digester tower for the production of organic fertilizer from comminuted organic waste material comprised by a plurality of vertically ranged tower sections each having a bottom with an opening therein, a first conveyor for raising the organic waste material to the level of the uppermost tower section, a screw conveyor between the top of the first conveyor and the top of the uppermost tower section for receiving the organic waste material from the first conveyor and forcing same into the uppermost tower section, a liquid extruding means comprised by a fixed plate having radially spaced and arcuately extending apertures therein and a movable plate having radially spaced and arcuately extending apertures therein at the exit end of the screw conveyor, a hopper on the uppermost tower section for holding bacteria containing material, a rotary valve between the bottom of the hopper and the uppermost tower section for feeding the bacteria containing material from the former into the latter, means for rotating said valves, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

6. A digester tower for the production of organic fertilizer from comminuted organic waste material comprised by a plurality of vertically ranged tower sections each having a bottom with an opening therein, a conveyor for feeding the organic waste material to the uppermost tower section, a hopper in the uppermost tower section for holding bacteria containing material, a rotary valve between the bottom of the hopper and the uppermost tower section for feeding the bacteria containing material from the former into the latter, means for rotating said valve, a vertically positioned shaft mounted centrally of the tower sections, an S shaped agitator blade curved on a taper from the axis to its outer ends mounted on said shaft in the uppermost tower section for horizontally agitating the organic waste material and the bacteria containing material, transversely extending shafts positioned above the bottoms of the lower tower sections and drivably connected to said vertically positioned shaft, agitator blades on said transversely extending shafts for vertically agitating the bacteria inoculated waste material, a motor drivably connected to said vertically positioned shaft for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

7. A digester tower for the production of organic fertilizer from comminuted organic waste material comprised by a plurality of vertically ranged tower sections each having a bottom with an opening therein, a conveyor for feeding the organic waste material to the uppermost tower section, a hopper on the uppermost tower section for holding bacteria containing material, a rotary valve between the bottom of the hopper and the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, a screw conveyor below the opening in the bottom of the uppermost tower section for force feeding the bacteria inoculated waste material from the latter tower section into the next lower tower section, means for rotating the screw conveyor, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

8. A digester tower for the production of organic fertilizer from comminuted organic waste material comprised by a plurality of vertically ranged tower sections each having an inverted frusto-conical side wall and a bottom with an opening therein, a conveyor for feeding the organic waste material to the uppermost tower section, a hopper on the uppermost tower section for holding bacteria containing material, a rotary valve between the bottom of the hopper and the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

9. A digester tower for the production of organic fertilizer from comminuted organic waste material comprised by a plurality of vertically ranged tower sections each comprised by an outer side wall, an inner inverted frusto-conical side wall, and a bottom with an opening therein spaced inwardly from the inner side wall and forming with the bottom of the tower section immediately above an annular space for heat medium, a conveyor for feeding the organic waste material to the uppermost section, a hopper on the uppermost tower section for holding bacteria containing material, a rotary valve between the bottom of the hopper and the uppermost tower section for feeding the bacteria containing material from the former into the latter, means for rotating said valve, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

10. A digester tower for the production of organic fertilizer from comminuted organic waste material comprised by a plurality of vertically ranged sections each comprised by an outer side wall, an inner inverted frusto-conical side wall, and a bottom with an opening therein spaced inwardly from the inner side wall and forming with the bottom of the tower section immediately above an annular space for heat medium, a vertically positioned hot air supply pipe along the side of the tower sections communicating with the annular spaces for heat medium in the several tower sections, a conveyor for feeding the organic waste material to the uppermost tower section, a hopper on the uppermost tower section for holding bacteria containing material, a rotary valve between the bottom of the hopper and the uppermost tower section for feeding the bacteria containing material from the former into the latter, means for rotating said valves, transversely extending shafts positioned above the bottoms of the lower tower sections, agitator blades on said shafts, a motor drivably connected to said shafts for rotating same, rotary valves below the openings in the bottoms of the lower tower sections for force feeding the bacteria inoculated waste material from one tower section into the next lower tower section, means for rotating the latter valves, and a conveyor for removing the organic fertilizer from the lowermost tower section.

References Cited in the file of this patent

UNITED STATES PATENTS

| | | |
|---|---|---|
| 89,406 | Hinman | Apr. 27, 1869 |
| 1,001,107 | Whittome | Aug. 22, 1911 |
| 1,193,581 | Mansbendel | Aug. 8, 1916 |
| 1,733,745 | Martin et al. | Oct. 29, 1929 |
| 2,043,265 | Roeder | June 9, 1936 |
| 2,049,889 | Boniface | Aug. 4, 1936 |
| 2,178,818 | Earp-Thomas | Nov. 7, 1939 |
| 2,639,902 | Kuebler | May 26, 1953 |
| 2,734,803 | Ruskin | Feb. 14, 1956 |
| 2,878,112 | Morrison | Mar. 17, 1959 |
| 2,879,151 | Melville | Mar. 24, 1959 |
| 2,929,688 | Riker et al. | Mar. 22, 1960 |
| 2,969,279 | Pierson | Jan. 24, 1961 |